United States Patent [19]

Grenier

[11] 4,136,852
[45] Jan. 30, 1979

[54] EXPANSIBLE PLUG VALVE

[75] Inventor: Wilfred J. Grenier, Rutland, Mass.

[73] Assignee: General Industries, Inc., Rutland, Mass.

[21] Appl. No.: 730,262

[22] Filed: Oct. 6, 1976

Related U.S. Application Data

[60] Continuation-in-part of Ser. No. 604,550, Aug. 14, 1975, Pat. No. 3,990,677, which is a division of Ser. No. 392,967, Aug. 30, 1973, Pat. No. 3,907,251.

[51] Int. Cl.² .................................................. F16K 25/00
[52] U.S. Cl. ..................................... 251/189; 251/191
[58] Field of Search ............... 251/167, 189, 190, 191, 251/309, 311, 155; 138/94, 94.3; 220/234, 235, 236, 237, 238

[56] References Cited

U.S. PATENT DOCUMENTS

| | | | |
|---|---|---|---|
| 1,695,536 | 12/1928 | Crowley | 251/324 X |
| 2,290,251 | 7/1942 | Saunders | 251/167 |
| 2,424,210 | 7/1947 | Sutton | 251/167 |
| 2,552,991 | 5/1951 | McWhorter | 251/191 UX |
| 2,925,246 | 2/1960 | Sardeson | 251/191 |
| 3,586,042 | 6/1971 | Grenier | 251/191 X |
| 3,688,798 | 9/1972 | Nightingale | 251/189 X |
| 3,747,479 | 7/1973 | Nightingale | 251/368 X |

FOREIGN PATENT DOCUMENTS 1513547  1/1968  France ........................................ 220/235

Primary Examiner—Harold W. Weakley

[57] ABSTRACT

A valve comprising a resiliently expansible and compressible plug movable in a valve chamber to open and close a flow passage intersected by the chamber. The plug has a sealing portion which is expanded outwardly against the walls of the chamber, e.g., by being compressed in a different direction to maintain a fluid type seal when the plug is moved in a chamber between open and closed positions of the valve.

In a preferred embodiment, the plug is provided with 1) a valve stem and includes 2) an inner elastomeric portion in the upper portion of which is embedded 3) a rigid plate-like member or disc, preferably formed integral with the valve stem, 4) a non-elastomeric ring-shaped anti-extrusion member, preferably formed of two or more complementary arcuate portions, suitably two semi-cylindrical ring portions, surrounding the lower portion of the inner elastomeric portion of the plug below the plate member, and 5) an outer elastomeric cover portion which completely surrounds the anti-extrusion ring member or members and preferably includes a base portion which covers the bottom of the inner elastomeric plug portion.

3 Claims, 27 Drawing Figures

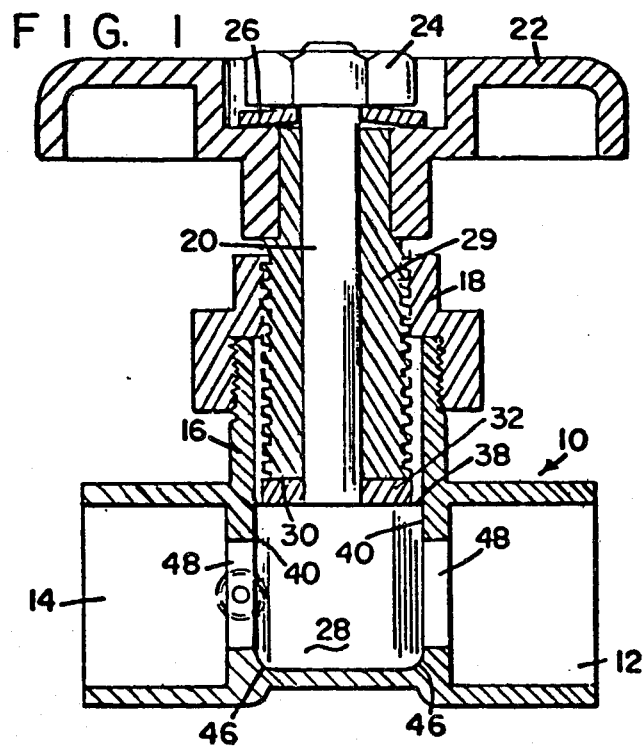
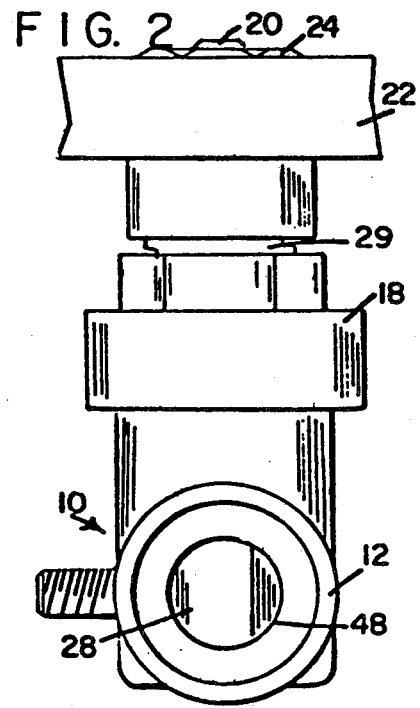
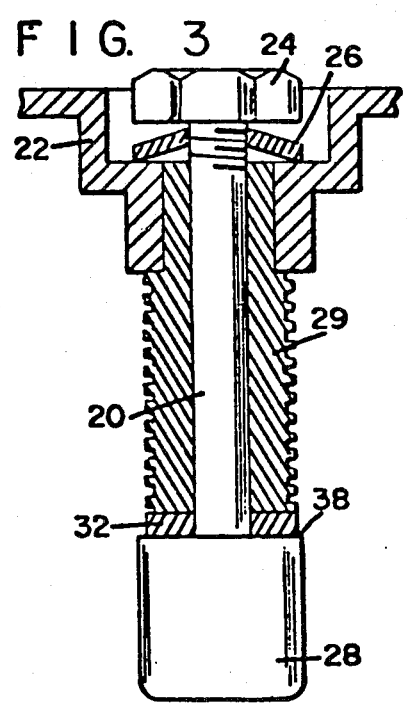
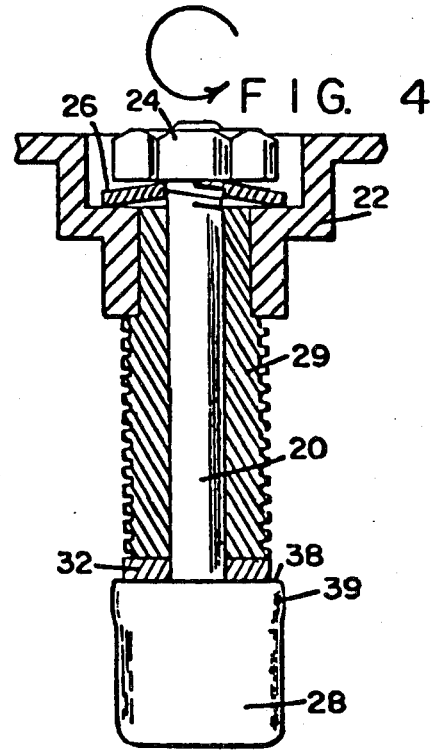

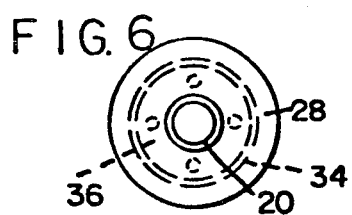
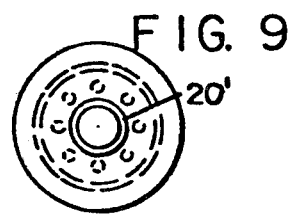
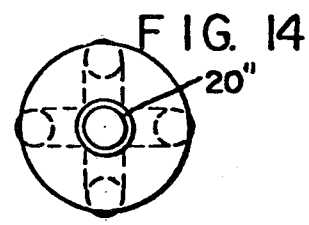
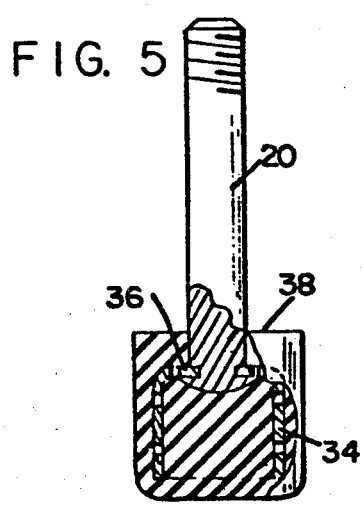
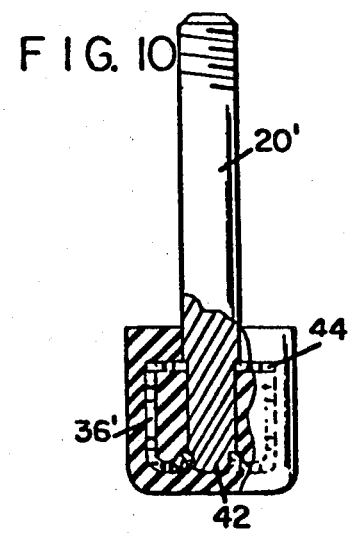
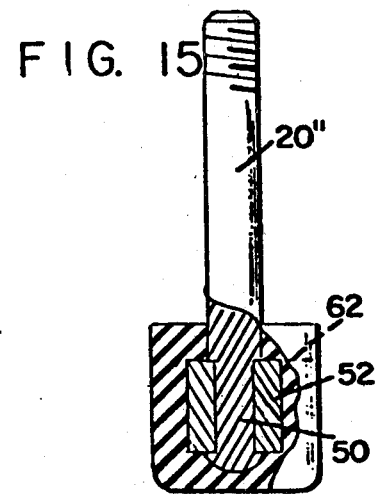
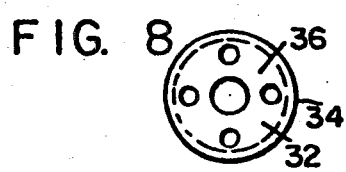
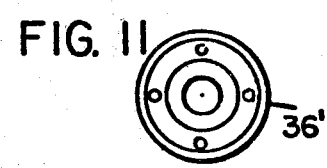
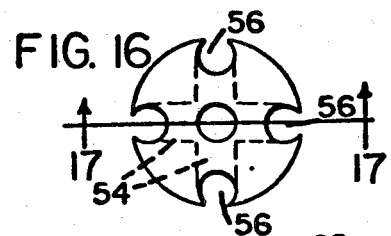
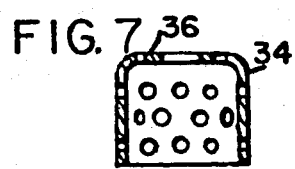
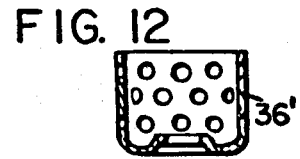
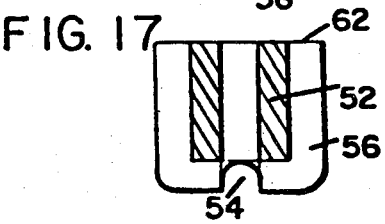
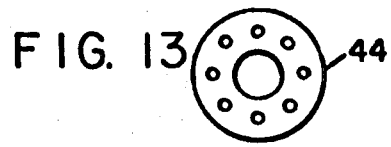
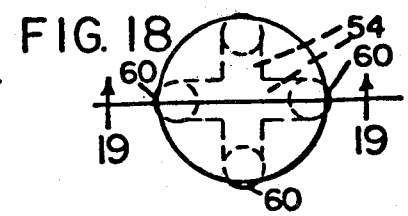
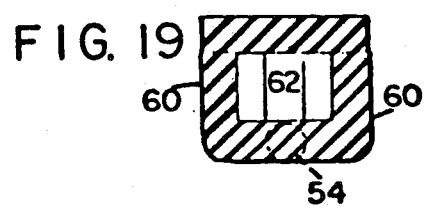

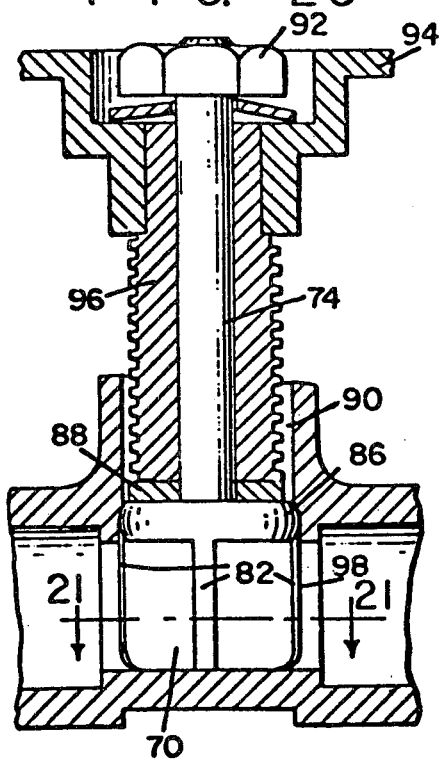
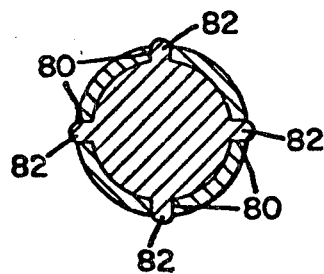
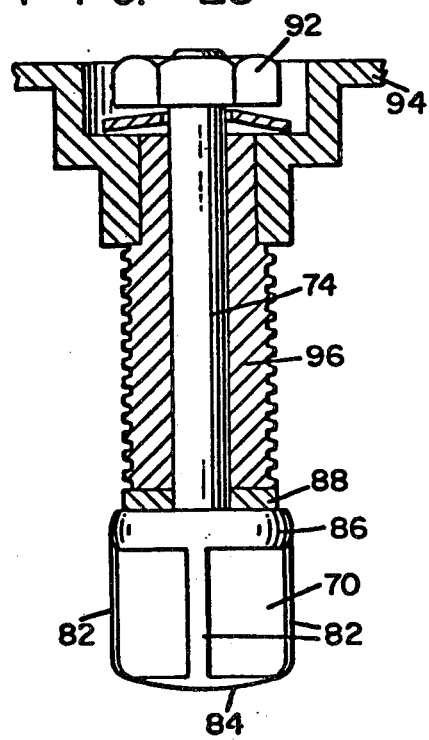
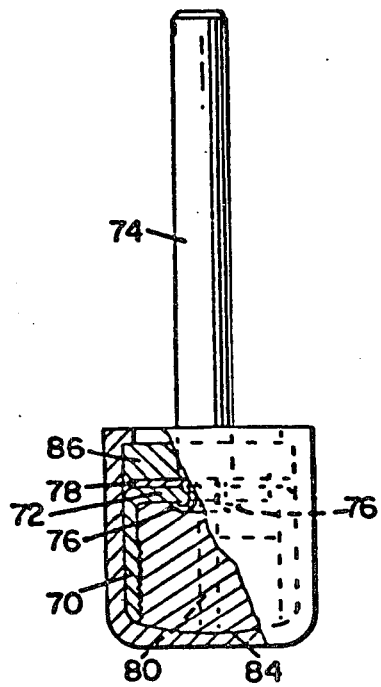

EXPANSIBLE PLUG VALVE

RELATED APPLICATIONS

The present application is a continuation-in-part of my application Ser. No. 604,550 filed Aug. 14, 1975 now U.S. Pat. No. 3,990,677 dated Nov. 9, 1976 which is a division of my application Ser. No. 392,967 filed Aug. 30, 1973 now U.S. Pat. No. 3,907,251 dated Sept. 23, 1975.

BACKGROUND OF THE INVENTION

Valves have been proposed for regulating fluid flow which utilize over-travel of a valve handle past that required to open or close the fluid passage so as to exert a compressive pressure on an expansible elastomeric plug in a manner expanding it outwardly against the surrounding walls for forming a seal. One of these valves is shown in U.S. Pat. No. 3,260,498. Although such valves are advantageous in eliminating gaskets, packings, and the like, they have drawbacks among which is the fact that such compressed expanded plugs extrude into the openings for the flow passage and thereby make it very difficult to open the valve and indeed in many instances destroy the plug by disrupting the material thereof as the parts of the plug that are extruded into the flow passage openings resist motion past the edges of the same and become sheared or fractured.

I am also familiar with U.S. Pat. No. 2,552,991, McWhorter, dated May 15, 1951, cited in my Pat. No. 3,907,251. This patent will be further discussed in connection with the preferred form of my invention which will be more fully described hereinafter.

SUMMARY OF THE INVENTION

The object of the present invention is to provide an expansible elastomeric plug valve in which, when the compressive forces back off, the plug will relax sufficiently to allow it to be withdrawn from the flow passage easily for opening the valve without damage to the plug; and also the plug may be compressed in the opposite direction when the plug is seated in order to firmly seat the same and provide a leakproof function in the flow passage.

This is done by providing a valve elastomeric plug slidably movable transversely to the flow passage to open and close the flow passage, and including means for expanding it comprising first and second rigid elements confining a part only of the plug between them, one of the rigid elements being embedded in the plug and the other of the rigid elements being spaced from the first element axially along the stem which is connected to the first element, together with biasing means to urge the rigid members toward each other compressing the sealing portion of the plug between them so as to expand the sealing portion outwardly but only in one portion of the plug.

Also, motion of the embedded rigid element away from the second rigid element will compress and expand the plug in a different portion thereof to the end that the plug may be sealed in either open or shut condition thereof. Alternatively the plug may be sealed in the area of the flow passage by turning the biasing means in the opposite direction.

BRIEF DESCRIPTION OF THE DRAWINGS

FIG. 1 is a vertical transverse section showing a valve embodying the present invention;
FIG. 2 is a view in elevation thereof;
FIG. 3 is a sectional view illustrating the plug and its expanding means in relaxed condition;
FIG. 4 is a view similar to FIG. 3 showing the same in expanded position in a certain area only thereof;
FIG. 5 is a sectional view of one form of the plug;
FIG. 6 is a top plan view thereof;
FIG. 7 is a sectional view of the embedded element;
FIG. 8 is a top plan view thereof;
FIG. 9 is a top plan view of FIG. 10;
FIG. 10 is a view similar to FIG. 5 showing a modification;
FIG. 11 is a top plan view of the member shown in FIG. 12;
FIG. 12 is a sectional view of a portion of the embedded member shown in FIG. 10;
FIG. 13 is a view illustrating a closure for the embedded member shown in FIG. 10;
FIG. 14 is a top plan view of FIG. 15, showing a further modification;
FIG. 15 is a view similar to FIG. 5, illustrating the further modification;
FIG. 16 is a top plan view of the embedded member in the plug shown in FIG. 15;
FIG. 17 is a section on line 17—17 of FIG. 16;
FIG. 18 is a bottom plan view thereof;
FIG. 19 is a section on line 19—19 in FIG. 18 illustrating the elastomeric material therein;
FIG. 20 is a view similar to FIG. 1, showing a further modification with the valve closed;
FIG. 21 is a section on line 21—21 of FIG. 20;
FIG. 22 is a view of the valve of FIG. 20 illustrating its construction with a Teflon cover;
FIG. 23 shows the valve expanded.

SPECIFIC EMBODIMENTS OF THE INVENTION

Figure 24:
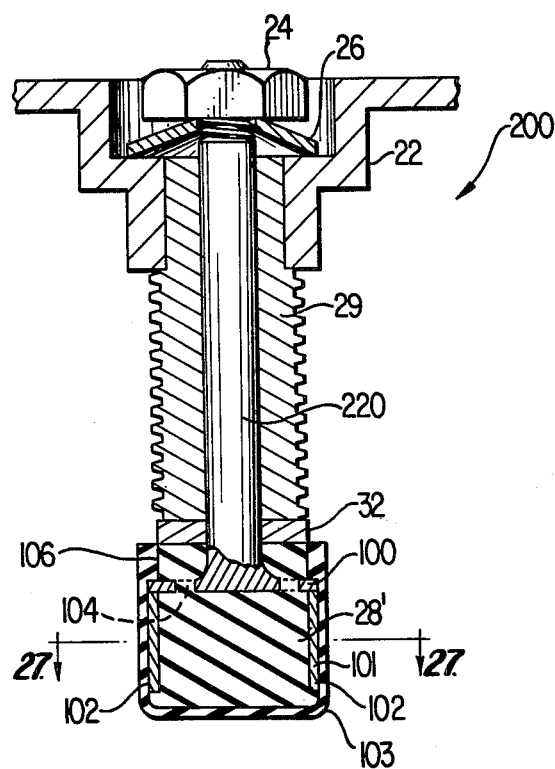
FIG. 24 is a valve somewhat similar to FIG. 3 but shows a further modification and preferred embodiment of the invention in that the elastomeric plug of the assembly is provided with a non-expansible anti-extrusion ring-shaped member embedded in the plug and surrounded by an elastomeric cover member, the plug being shown in relaxed position in FIG. 24.
Figure 27:
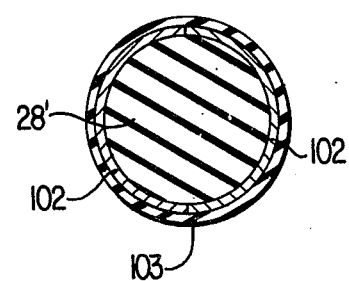
FIG. 27 is a cross section on lines 27—27 of FIG. 24.

Referring now to FIGS. 1 and 2 which show the general setup of the present invention, the reference character 10 indicates a valve housing having fittings at 12 and 14 for attachment to piping, etc., an externally upright threaded member 16 engaged with an internally threaded cap 18 and having a stem 20 therein. The stem 20 extends through a handle 22 and has a threaded end for a nut 24, there being a spring washer 26 under the nut.

The lower end of the stem 20 has attached thereto the elastomeric plug which in this case is shown as cylindrical and which is indicated at 28.

An externally threaded ferrule generally indicated at 29 is engaged with the cap 18 and forms an abutment at 30 for a rigid washer member or the like 32 external of but abutting the plug 28.

Referring now to FIGS. 5 to 8 inclusive, the elastomeric plug 28 has embedded therein an inverted perforated cup 34. This cup has a perforated bottom 36 which is riveted to the lower end of the stem 20. The perforated bottom of the inverted cup is spaced from the upper flat surface 38 of the plug upon which lies the rigid washer 32, and it will be seen that these members are relatively close together as compared to the disclosure in the patented plug, U.S. Pat. No. 3,260,498. The perforations enable the elastomeric material of the plug to be thoroughly embedded and mechanically connected with respect to the stem 20.

Upon turning the nut 24 in the direction of the arrow in FIG. 4 it will be seen that the plug 28 is expanded only in the area which is indicated at 39, FIG. 4. Thus when this is done with the plug in the position shown in FIG. 1, the bulge or extension 39 impinges firmly upon the interior wall at 40, 40 of the plug chamber, thereby completely sealing the stem area, etc. On the other hand, the plug can be withdrawn easily and is not sheared or worn in any way as would otherwise be the case were the plug to impinge upon the sharp edges defining the lower portion of the walls in the area of 40, 40, FIG. 1.

As a feature of this invention, the plug is expanded as described in the air before it is applied to the valve and in this way it can be adjusted with reasonable exactness in order to provide a plug which is sealing at all times whether it is open or closed or inbetween and which can be opened or closed easily by the handle 22 without the necessity of adjusting the amount of expansion of the plug in the area indicated at 39, FIG. 4, without changing the position of the nut.

Now referring to FIGS. 9 to 13 inclusive, there is shown a valve plug which is adapted to be used for higher pressure installations than the plug shown in FIG. 5, because the perforated insert 36' is in the form of an upright cup which is riveted to stem 20' at the lower end of the plug as at 42. This insert has a perforated closure plate at its upper end as at 44 and in this case it is seen that a completely enclosed basketlike member is utilized as the embedded member. In this case, stem 20' may be moved downwardly compressing the bottom of the plug in the area at the bottom of the plug chamber and expanding it in this area indicated at 46, 46 in FIG. 1, as well as in the area of the flow passages which are indicated at 48, 48, thus forming a seal against flow in either direction when the plug is firmly seated.

Referring to FIGS. 14 to 19 inclusive, there is shown a very high pressure installation. In this case the plug is considerably different than those described before, the stem 20" having a semi-tubular rivet 50 which is a part of stem 20", which in turn secures insert 52 to stem 20", as best shown in FIG. 15. This insert has cross slots 54, 54 across the bottom and longitudinal side slots, preferably cylindrical, as at 56, 56.

In this case the slots 54 and 56 are filled with an elastomeric material which extends outwardly of the grooves as indicated in FIGS. 14 and 18 as at 60, 60. Thereby it will be seen that the elastomeric material will contact the plug chamber at all sides and at the bottom and the rigid washer 32, FIG. 1, on top, the latter being indicated as at 62, FIG. 15, but an equivalent to the internal flat surfaces 36' in FIG. 5, and 44' in FIG. 10.

In this case the action is substantially the same as above described but the fact is that the elastomeric material provides a seal at the bottom, in two directions, so that regardless of how the plug may be turned it will act as a bottom seal. The elastomeric material as at 60, 60 extends outwardly, engaging the side walls of the plug chamber and seals them against flow in either direction. At the same time the bulging of the material as at 39 in FIG. 4 is also accomplished by turning the nut 24" in the proper direction.

FIGS. 20 to 23 illustrate a variation of the plug assembly shown in FIGS. 14 to 19. An inverted cup 70 has a base 72 which is connected to stem 74 by any desired means as at 76, and this connection includes a plate 78 exterior of the base 72. This cup is slotted longitudinally at a plurality of circumferentially spaced points 80 and is internally threaded.

This assembly has rubber or other elastomeric material molded into it forming a plug filling the cup, appearing through the slots 80 as at 82, FIG. 21, and including a domed bottom 84 and a solid top block 86. A washer 88 bears on the rubber block 86, and by means of stem 74 bearing causes the block 86 to expand into contact with the walls of well 90 in the valve housing, sealing the valve from leaking. This may be pre-set by nut 92.

The handle 94 causes the screw 96 to move up or down to open or close the valve. The valve is expanded in FIG. 23 so that the rubber 82 in the slots 80 retracts relative to the cup and the dome 84 is not under pressure. When the valve closes, FIG. 20, the dome 84 is under pressure and flattens out the rubber at 82, 82 is pushed out into powerful contact with the valve body chamber wall at 98 along the plurality of lines defined by the rubber 82 and slots 80. This has the effect of completely sealing the valve at all sides, in a manner similar to the modification of FIGS. 14 to 19.

PREFERRED EMBODIMENT

Figure 25:
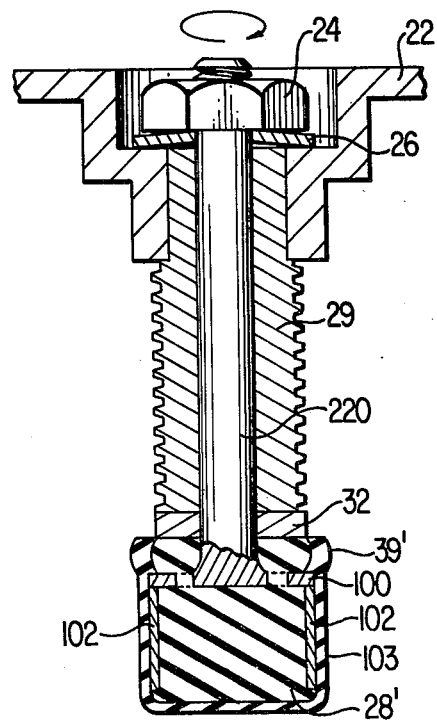
FIG. 25 is a view somewhat similar to FIG. 4 showing the plug of FIG. 24 in its expanded position.

In FIGS. 24 and 25, there is shown a plug valve assembly generally designated 200, similar in some respects to FIGS. 3 and 4 but with improvements both in the stem 20 and plug 28 of FIGS. 3 and 4, which improvements simplify the construction and operation of the valve assembly 200 as a whole, particularly as compared with valve assembly of McWhorter, U.S. Pat. No. 2,552,991, previously referred to.

Figure 26:
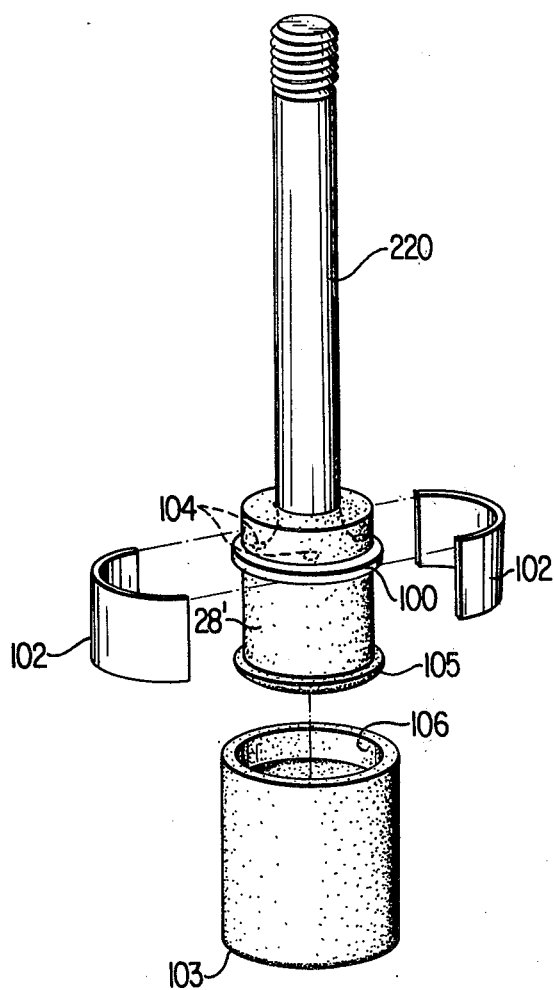
FIG. 26 is an exploded view showing the parts of the preferred device illustrated in FIGS. 24 and 25 in disassembled position.

The plug assembly 200 of FIGS. 24 and 25 is intended for use in the valve assembly shown in FIGS. 1 and 2 and the operation of the valve is in some respects similar to that previously described and the relation of parts is substantially the same except that the stem of the preferred device, herein designated 220 is provided with an outwardly flaring end flange, plate or disc portion 100 preferably integral with the stem 220 and being embedded in the inner elastomeric plug portion 28' below the top thereof and also spaced from the rigid washer or plate 32 previously described in conjunction with FIGS. 1 to 4. The improved plug assembly also includes a cylindrical anti-extrusion ring member 101 preferably composed of two or more complementary arcuate ring members 102, 102 (FIG. 26) which, when the parts are assembled completely surround the lower portion of the plug 28' and extend downwardly from the flange 100 at the end of the stem 220. The ring members 102, 102 are herein shown as two in number and semi-cylindrical in form but more than two complementary ring members may be employed if desired.

In accordance with the preferred embodiment of my invention, an elastomeric cover member 103 is provided for the plug 28' and the anti-extrusion members 102, 102. In some cases, the cover may be molded over the plug 28' but preferably, as herein shown, th cover is formed separately from the inner plug portion 28' and is snugly fitted over the inner elastomeric plug member 28' and the anti-extrusion ring members 102, 102 which constitute the composite ring member 101. The cover 103 is preferably formed of elastomeric material similar to the material of which the inner plug material is formed, such as rubber, which may be either synthetic or natural.

As shown flange 100 at the lower end of the stem 220 is provided with apertures 104. The improved elastomeric plug portion 28' may be molded over the lower end of the stem 220 including the flange 100, the apertures 104 of which allow the material of plug 28' to flow therethrough. The elastomeric plug 28' is shown as provided with a lower flange or bead 105 (FIG. 26) and extrusion ring members 102, 102 are assembled between the upper flange 100 and the bead 105 prior to the cover 103 being fitted thereover.

As shown the cover 103 is provided with an internal bead or flange 106 which fits over the periphery of the external flange portion 100 at the end of the stem 220. The improved plug assembly shown in FIGS. 24–25 is particularly adapted for use with high pressure rated valves.

The operation of the device shown in FIGS. 24–27 is generally similar to that disclosed in FIGS. 1 to 4 but specifically constitutes a marked improvement thereover.

Thus the plug assembly of FIG. 24 when in the unexpanded or relaxed position is moved downwardly into the valve housing 10 of FIG. 1 by turning the handle 22 in one direction, and may be withdrawn from the valve housing by turning the handle 22 in the opposite direction so long as the valve plug remains in the unexpanded position shown in FIG. 24, as described in connection with FIGS. 1–4.

To insure a tight seal, however, it is only necessary to rotate the lock nut 24 in the proper position so as to press down on the lock washer 26 as indicated in FIG. 25 and as previousy described in connection with FIGS. 1–4, in order to cause compressive pressure to be applied between the washer or abutment 32 at the top of the elastomeric plug portion 28' and the flange member 100 witin the plug, thus causing bulge 39' to occur at the top of the plug 28' and the cover 103.

However, while the present embodiment of the invention (FIGS. 24–27) has certain features in common with the previously described embodiments it possesses marked advantages thereover. Thus while the upper part of the plug seal including the bulge 39' is somewhat similar to the construction previously described in connection with FIGS. 1 to 4, the lower portion functions differently owing to the presence of 1) the anti-extrusion ring 101 (FIG. 24) formed of complementary ring portions 102, 102 (FIG. 26, and 2) the elastomeric cover 103.

It will be assumed that the plug assembly of FIGS. 24 and 25 is applied to the valve assembly of FIG. 1 in place of the plug assembly of FIGS. 3 and 4 including plug 28. When the plug contacts the bottom of the valve port (FIG. 1), screw 29 keeps coming down as the handle 22 is tightened which causes elastomer to displace, thus exerting pressure against ring 101, which causes the elastomer cover 103 on the plug 28' to expand tightly against the side walls of the valve port and thus seal off the port.

When the screw 29 is turned to open the valve, the pressure relaxes against the bottom of the plug thus causing the elastomer to relax the presssure from against the composite ring 101 which allows the bottom portion of entire plug to move freely up to the full open or throttle position. Area 39' is in constant expanded condition at all times to provide back seal to the valve.

GRENIER VALVE ASSEMBLY (VALVE 200, FIGS. 24 AND 25)

In the following summary, the numbered items contrast the features of the Grenier valve with the features described in the McWhorter valve (U.S. Pat. No. 2,552,991), previously referred to.

1. The Grenier valve 200 is conventional to other type valves. The expandable plug provides the features of both a gate and globe valve.
2. The Grenier valve inside assembly is a one state situation.
3. The Grenier valve compresses the whole plug.
4. The Grenier valve 200 requires no fixed stop nor does it create any cavities in the body that could set up a contamination problem.
5. The Grenier valve 200 will seat properly at all times without orientation.
6. The Grenier valve 200 includes ring shaped anti-extrusion member 101 comprising complementary portions 102, 102 which provide a complete peripheral seal at all times.
7. The Grenier valve 200 is a combined stem and seat seal.
8. The anti-extrusion member 101, comprising the complementary ring portions 102, 102, is completely covered by the elastomeric sleeve or cover member 103.

The primary object of the present improvement is to permit use at very high pressures of elastomers that heretofore would not have been usable. I have eliminated the extrusion problem that results from compression set when the valve is left in the closed position under pressure or not for any length of time.

By the use of the back seal as described in Ser. No. 392,967, now U.S. Pat. No. 3,907,251, I have eliminated the need for any stuffing box arrangement and hence can provide a valve that will fit into a much smaller space.

The anti-expansion ring member 101 made up of any suitable non-elastomeric material and relatively non-expansible material, such as metal, wood, plastic or the like, and should be relatively stiff as compared with the elastomeric plug but may be, and preferably is, somewhat flexible.

MCWHORTER, U.S. PAT. NO. 2,552,991

This patent is previously referred to as constituting prior art and will be contrasted with the improved valve of the present invention.

MCWHORTER VALVE ASSEMBLY

1. McWhorter has many features that are conventional to other valves. For example:
   a. It has a conventional flange bonnet with tongue and groove connection to the body.
   b. Also conventional packing gland to adjust the stem packing.

c. Also screwed in back seal bushing.

d. Also conventional rising inside screw.

2. McWhorter inside assembly is a two-stage situation.

3. Mcwhorter compresses a partial assembly.

4. McWhorter has to have a definite stop for the seating cam action which results in an annulus in the bottom of the valve.

5. McWhorter has to depend upon a guide to keep the plug properly oriented to the proper position or there will be no sealing of the valve.

6. McWhorter employs plate inserts but does not use the plate inserts to help with the seal.

7. McWhorter seals 90° from the flow axis of the valve.

8. Mcwhorter plates are external and exposed at all times to the flow media.

The invention has been described in detail for the purpose of illustration, but it will be obvious that numerous modifications and variations may be resorted to without departing from the spirit of the invention as set forth in the accompanying claims. 9n

What is claimed is:

1. A flow valve for use in a valve housing having a flow passage, a valve chamber extending transversely to and intersecting said flow passage,
   a valve plug assembly movable in said chamber to open and close said flow passage, and
   a handle connected to said valve assembly for moving said valve assembly comprising
   a valve stem extending through said chamber, one end of the valve stem being located within the chamber and the other end being connected to said handle,
   a valve plug secured to the said one end of said valve stem, said plug being slidably movable in said chamber to open and close said flow passage, and formed of a resiliently expansible and compressible material, said plug having a sealing portion located in said channel between said fluid passage and said valve chamber, and
   means for expanding said sealing portion outwardly against said channel into fluid-tight sealing relationship with said channel, said valve plug including an inner body portion of elastomeric material and said stem including a flange portion at the lower end thereof, embedded in said body portion but extending peripherly beyond said body portion, a peripheral flange portion formed on said inner body portion and spaced from flanged portion of said stem, a ring member of nonexpansible material interposed between said flange portions and surrounding said elastomeric body portion, and an outer elastomeric cover member fitting over said ring member and the elastomeric body portion.

2. A valve plug as defined in claim 1 wherein the cover portion is provided with an internal flange at the upper end thereof, fitting over the peripheral flange portion on said stem.

3. A valve plug as defined in claim 1 wherein the cover member fits over the remote end of said elastomeric body portion.

* * * * *